United States Patent [19]

Meermans

[11] 4,060,838

[45] Nov. 29, 1977

[54] CENTERING PIN FOR CASSETTE APPARATUS

[75] Inventor: Jos Louis Hubert Meermans, Eindhoven, Netherlands

[73] Assignee: U.S. Philips Corporation, New York, N.Y.

[21] Appl. No.: 662,454

[22] Filed: Mar. 1, 1976

[30] Foreign Application Priority Data

Mar. 14, 1975 Netherlands .......................... 7503047

[51] Int. Cl.$^2$ ............................................ B65H 75/02
[52] U.S. Cl. ....................................... 360/96; 242/68.3
[58] Field of Search ................... 360/96, 93, 90, 132; 242/200, 68.3, 210; 85/8.3, 8.8

[56] References Cited

U.S. PATENT DOCUMENTS

| | | |
|---|---|---|
| 3,275,257 | 9/1966 | Cherniavskyj .................. 242/68.3 X |
| 3,620,468 | 11/1971 | Amour ................................. 242/68.3 |
| 3,794,265 | 2/1974 | Jantzen ................................ 242/68.3 |
| 3,825,208 | 7/1974 | Johnston et al. .................. 360/93 X |

*Primary Examiner*—John H. Wolff
*Attorney, Agent, or Firm*—Frank R. Trifari; David R. Treacy

[57] ABSTRACT

A cassette-recording apparatus provided with cassette centering pins having a locally thickened portion near their conical ends, and resilient means for pressing the centering edges of the openings in the cassette into engagement with the centering pins. Each of the centering pins comprises two parts which are separated from each other by an axial slit, one of the parts being rigidly connected to the frame of the cassette recorder and the other part being resiliently pressed away therefrom.

5 Claims, 3 Drawing Figures

CENTERING PIN FOR CASSETTE APPARATUS

BACKGROUND OF THE INVENTION

1. Field of the Invention

The invention relates to an apparatus for recording and/or playing back signals on and/or from a record carrier contained in a cassette hereinafter referred to as a cassette-recording apparatus, for example, a tape cassette recorder and/or player. Such apparatus comprises a deck plate; Two cassette-centering pins which are disposed perpendicular to the deck plate and are rigidly connected thereto at their bases, and which each have a substantially conical tip and a locally thickened portion near this tip which, when the cassette is in position on the apparatus, is located within the cassette while a portion of the centering pin located between the base and the tip thereof cooperates with a centering edge of an associated centering opening in the cassette, which opening corresponds to the associated centering pin; and resilient means for urging each centering pin and the centering edge of the respective centering opening in the cassette into engagement with one another.

2. Description of the Prior Art

It is known to give the centering pins the shape of a cylinder on which is coaxially disposed a cone with a base having a diameter greater than the diameter of the cylinder. The apex of the cone is rounded. The transition from the sloping side of the cone to the base thereof is also rounded. It is this transitional part of the cone which forms the locally thickened portion. In the cassette, centering openings are formed of such a size that they just fit the thickened portion with slight play. In the cassette-recording apparatus a leaf spring is provided which presses against the rear side of the cassette, so that as soon as the relevant cassette wall in which the centering openings are formed has passed the thickened portions of the centering pins, the leaf spring presses the centering edges of the centering openings against the cylindrical portions of the centering pins. When the cassette is removed the cassette wall again has to be moved over the thickened portions of the centering pins against the spring pressure, which requires a certain force, so that the centering pins in co-operation with said spring prevent the cassette from inadvertently springing out of position during use of the cassette-recording apparatus as shown, for example, in German Offenlegungsschrift No. 1,524,934.

An advantage of the use of this type of centering pin is that the cassette, in the inserted position, can make only very slight movements in a vertical direction because the cassette presses against the thickened portions of the centering pins; further no force is required which presses the cassette downwards to keep it in position. However, a drawback is that the cassette can be moved in the plane of engagement over a distance which in practice is approximately 0.7 mm. due to the difference in diameter between the cylindrical portion of the pin and the locally thickened portion, i.e., the rounded portion at the base of the cone.

For this reason completely cylindrical pins are sometimes used as shown, for example, in the aforementioned German Offenlegungsschrift No. 1,524,934. Owing to the absence of the locally thickened portion the pin as a whole may be slightly thicker, so that the play in the horizontal plane can be limited to approx. 0.17 millimeter. Furthermore, the cassette can be removed more easily from the pins. However, this means that during use of the cassette it must be kept in position by a force which is exerted perpendicularly to the plane of engagement. Consequently, the cassette-recording apparatus, in addition to having means for pressing the cassette against the pins in the plane of engagement, must also be provided with additional pressure means. These means have to be provided on a lid which covers the cassette during use. With conventional plastic lids the resulting reactive force on the lid gives rise to undesired distortion.

SUMMARY OF THE INVENTION

The object of the invention is to provide an apparatus having centering pins which combine the advantages of the known types of centering pins.

According to the invention each of the centering pins is longitudinally split along at least part of its length so that each centering pin comprises a first part and a second part which are separated from each other by a slit extending longitudinally of the pin, the first part of each centering pin being rigidly connected to said deck plate and the second part being urged away from the first part by the resilient means.

In order to avoid undesired axial movements of the conical tips of the centering pins in a preferred embodiment each of the two centering pins has the longitudinal slit extending through the base of the pin, the second part is resiliently connected to the deck plate so as to be movable transversely of the longitudinal axis of the centering pin, the conical tip is formed substantially on the first part, and the second part is separated from the tip by a slit which extends transversely of the pin and joins the longitudinal slit. It is advantageous if the locally thickened portion is located wholly on the first part.

In the interests of low manufacturing costs, in a further preferred embodiment the first and second parts of each centering pin as well as the associated resilient means are an integral injection-molded component made of a synthetic material, which is fixed to the deck plate. The second part of each of the two centering pins is lodged at its base in an associated mount having an opening in which the second part is movable to a limited extent transversely of the longitudinal axis of the centering pin. The second part is connected at its base to the associated resilient means, which is substantially in the form of a leaf spring, and the second part is axially movable into and out of the associated mount against the spring force of the associated leaf spring.

BRIEF DESCRIPTION OF THE DRAWING

An embodiment of the invention will be described in more detail with reference to the drawings, in which.

DESCRIPTION OF THE PREFERRED EMBODIMENTS

Figure 1:
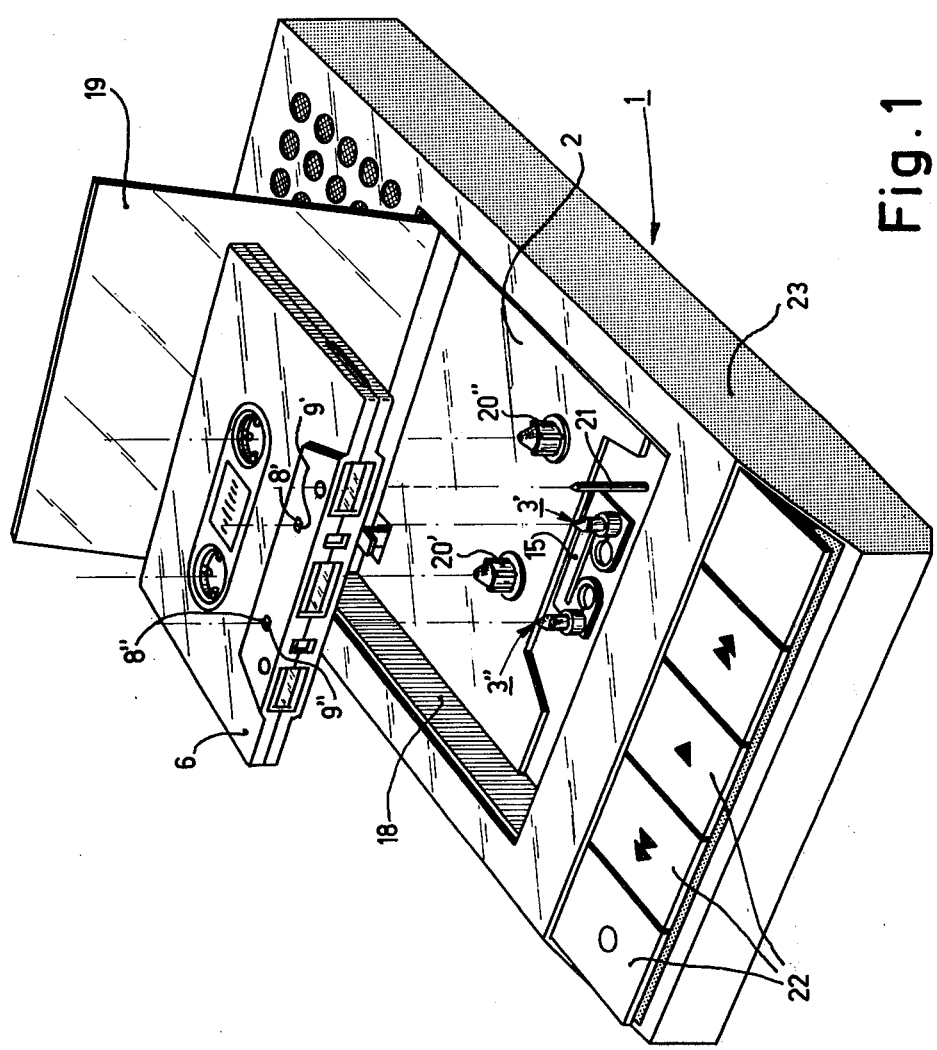
FIG. 1 is a perspective view of a cassette-recording apparatus embodying the invention.

In the drawings, parts which are duplicated are given the same reference numerals and distinguished from one another by single and double prime markings (' and ") respectively. For simplicity, these markings are omitted from the following description.

Figure 2:
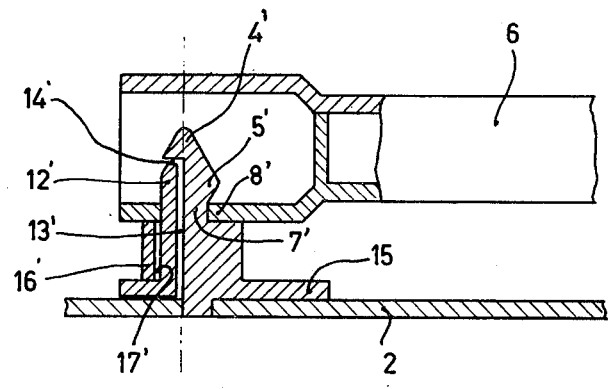
FIG. 2 is a cross-section of a centering pin according to the invention, a cassette being disposed on the centering pin and being shown partly in cross-section.

The cassette recording apparatus 1 comprises a deck plate 2 on which are perpendicularly disposed two cassette-centering pins 3 which at their bases are rigidly connected to said plate. These pins each have a substantially conical tip 4 and near this tip a locally thickened portion 5. When the cassette 6 is in position on the apparatus (see FIG. 2), the locally thickened portion 5 of each centering pin is located inside the cassette. A portion 7 of each centering pin located between the tip and the base 15 of the pin co-operates with a centering edge 8 of an associated centering opening 9 in the cassette, which opening corresponds to the centering pin.

Each of the centering pins 3 is axially split along at least part of its length so that each centering pin comprises first and second parts 11 and 12 which are separated from each other by an axial slit 13. The first part 11 is rigidly connected to the deck plate 2 by the base 15, while the second part 12 is urged away from the first part 11 by resilient means 10. These resilient means urge each centering pin and the centering edge 8 of the respective centering opening 9 in the cassette into engagement with one another.

The apparatus 1 is provided with a compartment 18 for accommodating the cassette 6. The compartment can be closed by a hinged flap 19. On the deck plate 2 winding spindles 20 and a capstan 21 are located, in addition to the centering pins 3. The operation of the apparatus is controlled with the aid of a number of push-buttons 22 which are hingeably secured to the housing 23 of the apparatus.

Figure 3:
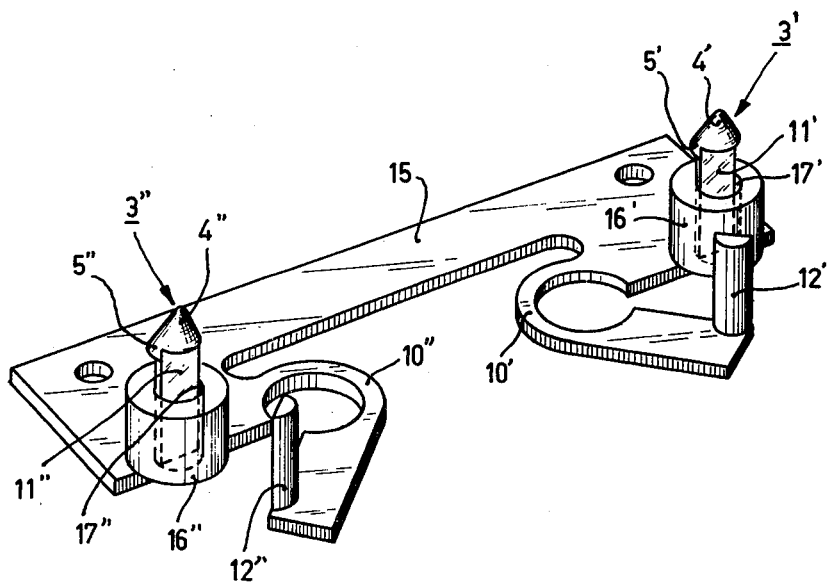
FIG. 3 is an alternate molded perspective view of a plastic injection-molded component which comprises two centering pins whose movable second parts are connected to strip-shaped connecting pieces by integral plastic leaf springs, the second parts being shown prior to their insertion in the associated mounts.

In each of the centering pins 3 the axial slit 13 extends through the base of the pin. The second part 12 of each pin is connected to the deck plate 2 by the resilient means 10 and the base 15 so as to be movable transversely of the longitudinal axis of the centering pin. The effect is that of pivoting about an axis remote from the longitudinal axis, as shown in FIG. 3. The conical tip 4 is formed substantially on the first part 11 of the pin. In addition to the axial slit 13 each pin is divided by a transverse slit 14 which separates the second part 12 of the pin from the conical tip 4 thereof. The locally thickened portion 5 of each pin is located wholly on the first part 11.

In the embodiment of FIG. 3, the first part 11 and the second part 12 of each centering pin as well as the associated resilient means 10 are integral with an extended base 15, formed as an injection molded component which is made of a thermoplastic material and which is secured on the deck plate 2. The base of the second part 12 of each centering pin is lodged in an associated mount 16 extending from base 15, the mount having an opening 17 in which the part 12 is movable to a limited extent transversely of the longitudinal axis of the centering pin. The part 12 is connected at its base to the associated resilient means 10, which is substantially in the form of a leaf spring. For assembly purposes the second part 12 of each centering pin is movable axially into and out of the associated mount 16 against the spring force of the associated leaf spring 10.

What is claimed is:

1. In a cassette-recording apparatus for use with a cassette having at least one centering opening having a centering edge and comprising a deck plate; at least one cassette-centering pin having a longitudinal axis disposed perpendicular to the plate, and having a base connected to the plate and a tip having a locally thickened portion; and resilient means for urging a portion of the pin and a centering edge of a cassette into engagement with one another, the improved centering pin consisting of a unitary molding wherein the pin is longitudinally split along at least part of its length such that the pin comprises a first part and a second part separated from each other by a longitudinal slit extending through the base of the pin, said first part being rigidly connected to said deck plate; and said resilient means comprises a resilient connection of the second part to the deck plate for pivotally urging said second part away from said first part about an axis remote from and parallel to said longitudinal axis.

2. An apparatus as claimed in claim 1, wherein said tip is formed on the first part, and said second part is separated from said tip by a transverse slit communicating with said longitudinal slit.

3. An apparatus as claimed in claim 2, wherein said locally thickened portion is wholly on said first part.

4. In a cassette-recording apparatus for use with a cassette having at least one centering opening having a centering edge and comprising a deck plate; at least one cassette-centering pin having a longitudinal axis disposed perpendicular to the plate, and having a base connected to the plate and a tip having a locally thickened portion; and resilient means for urging a portion of the pin and a centering edge of a cassette into engagement with one another, the improved centering pin comprising a first part, a second part and resilient means for urging said second part away from said first part, said first and second parts and resilient means being formed from one unitary molding secured to the deck plate; wherein the pin is longitudinally slit along at least part of its length thereby separating said first and second parts from each other by a longitudinal slit extending through the base of the pin, said first part being rigidly connected to the deck plate; and said resilient means comprises a resilient connection of the second part to the first part for pivotally urging said second part away from said first part about an axis remote from and parallel to said longitudinal said axis.

5. An apparatus as claimed in claim 4, wherein said resilient means comprises a leaf spring, said second part having a base connected to said leaf spring; said molding comprises a mount having an opening into which said second part is axially movable against force of said leaf spring; and said opening has a size large enough to permit limited movement of said second part transversely of the longitudinal axis when said second part is in said opening.

* * * * *